(12) United States Patent
Takahashi et al.

(10) Patent No.: US 8,444,100 B2
(45) Date of Patent: May 21, 2013

(54) RETAINER STRUCTURE

(75) Inventors: Shigeru Takahashi, Toyota (JP);
Yoshiki Ishikawa, Toyota (JP)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 13/375,342

(22) PCT Filed: Jun. 4, 2010

(86) PCT No.: PCT/JP2010/059560
§ 371 (c)(1),
(2), (4) Date: Feb. 6, 2012

(87) PCT Pub. No.: WO2010/140690
PCT Pub. Date: Dec. 9, 2010

(65) Prior Publication Data
US 2012/0131774 A1    May 31, 2012

(30) Foreign Application Priority Data

Jun. 4, 2009  (JP) ................................. 2009-135445

(51) Int. Cl.
*E05B 65/12* (2006.01)
*B60K 15/05* (2006.01)

(52) U.S. Cl.
USPC ............ 248/222.52; 248/220.21; 248/220.22; 248/222.11; 248/222.12; 248/222.13; 248/222.51; 211/193; 403/252; 403/253

(58) Field of Classification Search
USPC .................. 248/629, 220.21, 220.22, 222.11, 248/222.12, 222.13, 222.51, 222.52, 224.7, 248/224.8, 222.41, 223.21; 411/354, 360–363; 211/57.1, 59.1, 193, 87.01; 403/166, 304, 403/359.4, 353, 348, 349, 238, 240, 252, 403/253, 254
See application file for complete search history.

(56) References Cited

U.S. PATENT DOCUMENTS

| | | | | | |
|---|---|---|---|---|---|
| 2,424,757 | A | * | 7/1947 | Klumpp, Jr. | 174/153 G |
| 3,042,161 | A | * | 7/1962 | Meyer, Jr. | 52/166 |
| 3,107,571 | A | * | 10/1963 | Burg | 411/516 |
| RE30,850 | E | * | 1/1982 | Gordy et al. | 403/197 |
| 4,756,638 | A | * | 7/1988 | Neyret | 403/261 |
| 4,893,426 | A | * | 1/1990 | Bixler | 42/75.01 |

(Continued)

FOREIGN PATENT DOCUMENTS

| | | |
|---|---|---|
| JP | H08-093295 | 4/1996 |
| JP | H08-093295 A | 4/1996 |

(Continued)

OTHER PUBLICATIONS

European Patent Office, "Supplementary European Search Report for EP 10 78 3472", Nov. 7, 2012.

*Primary Examiner* — Terrell McKinnon
*Assistant Examiner* — Michael McDuffie
(74) *Attorney, Agent, or Firm* — Manabu Kanesaka

(57) ABSTRACT

A retainer structure having excellent workability of attaching to and removing from a panel is obtained. In an approximately cylindrical retainer main body (22), a cap holding portion (26) for attaching a cap (18) which is an attached member, and a panel clamping piece (32) contacting a body panel (14) from a side opposite to a seal packing (20) so as to clamp the body panel (14) between the panel clamping piece and a flange portion (24), are formed. The cap holding portion (26) and the panel clamping piece (32) are formed at positions different in a circumferential direction of the retainer main body (22).

3 Claims, 12 Drawing Sheets

U.S. PATENT DOCUMENTS

| | | | | |
|---|---|---|---|---|
| 5,044,985 | A | * | 9/1991 | Sheen .......................... 439/544 |
| 5,259,788 | A | * | 11/1993 | Nishimura et al. ........... 439/565 |
| 5,593,265 | A | * | 1/1997 | Kizer .......................... 411/552 |
| 5,597,260 | A | * | 1/1997 | Peterson ...................... 403/319 |
| 6,574,924 | B2 | * | 6/2003 | Maniezzo ...................... 52/36.4 |
| 6,938,859 | B2 | * | 9/2005 | Beausoleil ................... 248/27.1 |
| 7,641,161 | B2 | * | 1/2010 | Bauer ...................... 248/221.11 |
| 7,708,489 | B2 | * | 5/2010 | Trotter et al. ................. 403/194 |
| 8,047,475 | B2 | * | 11/2011 | Fukumoto et al. .............. 248/73 |
| 2005/0263655 | A1 | * | 12/2005 | Bauer ...................... 248/223.31 |

FOREIGN PATENT DOCUMENTS

| | | |
|---|---|---|
| JP | 2000-008672 | 1/2000 |
| JP | 2000-008672 A | 1/2000 |
| JP | 2007-292263 | 11/2007 |
| JP | 2007-292263 A | 11/2007 |

* cited by examiner

RETAINER STRUCTURE

RELATED APPLICATIONS

The present application is National Phase of International Application No. PCT/JP2010/059560 filed Jun. 4, 2010, and claims priority from Japanese Application No. 2009-135445, filed Jun. 4, 2009.

TECHNICAL FIELD

The present invention relates to a retainer structure, more specifically, the retainer structure for holding an attached member in a state inserted into an attachment hole of a vehicle-body panel.

BACKGROUND ART

As a structure for attaching a component (the attached member) relative to a panel, in Patent Document 1, there is shown a structure in which a jaw portion of the component is inserted to pass through the attachment hole of the panel, and a retainer clip is engaged with the jaw portion of a protruding small-diameter portion so as to attach by clamping the panel with an expanding width portion.

However, in the structure of the Patent Document 1, when the component is attached to the panel, or removed from the panel, it is required that the retainer clip is engaged with the component, or removed from the component by coming around a back face side of the panel, to cause bad workability.

On the other hand, in Patent Document 2, there is described a structure wherein a convex portion in which a latch-and-hold piece of a cap (the attached member) is latched and held, and a groove for fixing a retainer in a bracket (the panel on a vehicle body side) are formed in the cylindrical retainer.

However, in the structure of the Patent Document 2, in order to attach the retainer to the bracket, it is required to rotate the retainer further after the retainer is inserted into the attachment hole, so that an improvement in further workability is desired.

Patent Document 1: Japanese Patent Publication No. H07-190030

Patent Document 2: Japanese Patent Publication No. 2000-8672

DISCLOSURE OF THE INVENTION

Problems to be Solved by the Invention

In view of the aforementioned fact, an object of the present invention is to obtain a retainer structure with excellent workability of attaching and removing to and from the panel.

Means for Solving the Problems

A retainer structure of the present invention comprises a retainer main body inserted into an attachment hole of a panel, and also capable of rotating in a circumferential direction orthogonal to an insertion direction in an insertion state; a contacting piece formed by expanding a diameter of the retainer main body, and contacting a contacted member on the panel side by an insertion into the attachment hole so as to restrict the insertion; a clamping piece protruding from the retainer main body, contacting a hole wall of the attachment hole by inserting the retainer main body into the attachment hole, elastically evacuating to a retainer main body side so as to allow the insertion, and in a state wherein the retainer main body is inserted for a predetermined amount, elastically restoring to original state, clamping the panel between the clamping piece and the contacting piece, and also capable of passing through in a natural state relative to an expanded-diameter portion in which a diameter of the attachment hole is partially expanded; and an attaching piece in which an attached member is attached at an end side in the insertion direction rather than the clamping piece in the retainer main body, and also capable of passing through the expanded-diameter portion. The clamping piece and the attaching piece are formed in a position different in the circumferential direction of the retainer main body such that a position, in which the retainer main body has rotated relative to the panel when the clamping piece passes through the expanded-diameter portion, differs from a position in which the retainer main body has rotated relative to the panel when the attaching piece passes through the expanded-diameter portion.

In the retainer structure, the attached member is attached to the attaching piece of the retainer main body. Since the attaching piece can pass through the attachment hole in the expanded-diameter portion, in a state wherein positions of the attaching piece and the expanded-diameter portion are matched, the retainer main body can be inserted into the attachment hole of the panel. At this time, when the clamping piece contacts the hole wall of the attachment hole, the clamping piece elastically evacuates to the retainer main body side so as to allow the insertion of the retainer main body, and the retainer main body can be inserted into the attachment hole further. Then, when the retainer main body is inserted for the predetermined amount, the clamping piece elastically restores to original state, and clamps the panel between the clamping piece and the contacting piece, so that through the retainer main body, the attached member is attached to the panel. Substantially, an attachment to the panel can be completed only by an operation of inserting the retainer main body to the attachment hole.

In the aforementioned state, even if the retainer main body is simply attempted to be pulled out of the attachment hole in a direction opposite to the insertion direction, the clamping piece is contacted with the panel so as not to move in a pull-out direction. However, since the retainer main body can rotate in the circumferential direction orthogonal to the insertion direction in the insertion state into the attachment hole, the retainer main body is rotated in such a way that the clamping piece is in a position corresponding to the attachment hole. The clamping piece can pass through the expanded-diameter portion in the natural state (a state of not being elastically deformed) so as to be capable of moving the retainer main body in the pull-out direction.

Here, the clamping piece and the attaching piece are formed in a position different in the circumferential direction of the retainer main body such that a rotational position of the retainer main body relative to the panel when the clamping piece passes through the expanded-diameter portion, differs from a rotational position of the retainer main body relative to the panel when the attaching piece passes through the expanded-diameter portion. Therefore, in a state wherein the clamping piece has passed through the expanded-diameter portion, even if the retainer main body is attempted to be pulled out further, the attaching piece contacts the panel in the course thereof so as to restrict the movement. However, since the attaching piece can pass through the attachment hole in the expanded-diameter portion, if the retainer main body is rotated further so that the attaching piece is in a position corresponding to the expanded-diameter portion, the retainer main body is moved in the pull-out direction further so as to be capable of pulling out of the attachment hole. Specifically, only by a rotation relative to the retainer main body and a movement in the pull-out direction, the retainer main body can be removed from the panel.

Thus, in the present invention, the retainer main body can be attached only by the operation of inserting the retainer main body into the attachment hole, and furthermore, the retainer main body can be removed only by the rotation of the retainer main body and the movement in the pull-out direction so as to have excellent workability of attaching to and removing from the panel.

In the present invention, the retainer structure may have a structure including a rotation-restriction member formed in the retainer main body; housed in the expanded-diameter portion in a state wherein the clamping piece jolts out of alignment in the circumferential direction relative to the expanded-diameter portion, and the retainer main body is inserted up to a predetermined position to restrict a rotational range of the retainer main body in the circumferential direction; and also fractured by a rotational force more than a predetermined value.

In a state wherein the clamping piece is placed out of alignment in the circumferential direction relative to the expanded-diameter portion in such a manner, even if the retainer main body is attempted to be moved in the pull-out direction, since the clamping piece hits the panel, the retainer main body cannot be pulled out. In this state, even if the retainer main body is attempted to be rotated in the circumferential direction, the rotation-restriction member housed in the expanded-diameter portion contacts a hole wall of the expanded-diameter portion so as to restrict the rotation, so that the retainer main body can be prevented from escaping from the attachment hole carelessly.

The rotation-restriction member is constituted so as to be fractured if a rotational force more than the predetermined value acts on the retainer main body. Therefore, when the retainer main body is pulled out of the attachment hole, at first, by allowing the rotational force more than the predetermined value to act on the retainer main body, the rotation-restriction member is fractured, so that the retainer main body may be capable of rotating.

In the present invention, the retainer structure may have a structure including a movement-restriction wall protruding from the retainer main body, and when the retainer main body moves in the pull-out direction from the attachment hole, the movement-restriction wall allows the retainer main body to pass through the expanded-diameter portion, and also restricts the movement of a retainer by contacting the panel except for the expanded-diameter portion.

Thereby, in a case when the retainer main body is pulled out of the attachment hole and removed from the panel, when the retainer main body is moved in the pull-out direction, the movement-restriction wall hits the panel so as to halt the movement. Here, by rotating the retainer main body, the movement-restriction wall passes through the expanded-diameter portion, so that the retainer main body can be pulled out further.

Effect of the Invention

Since the present invention has the aforementioned structure, the retainer structure, which excels in the workability of attaching and removing to and from the panel, can be obtained.

EMBODIMENTS FOR CARRYING OUT THE INVENTION

Figure 1:
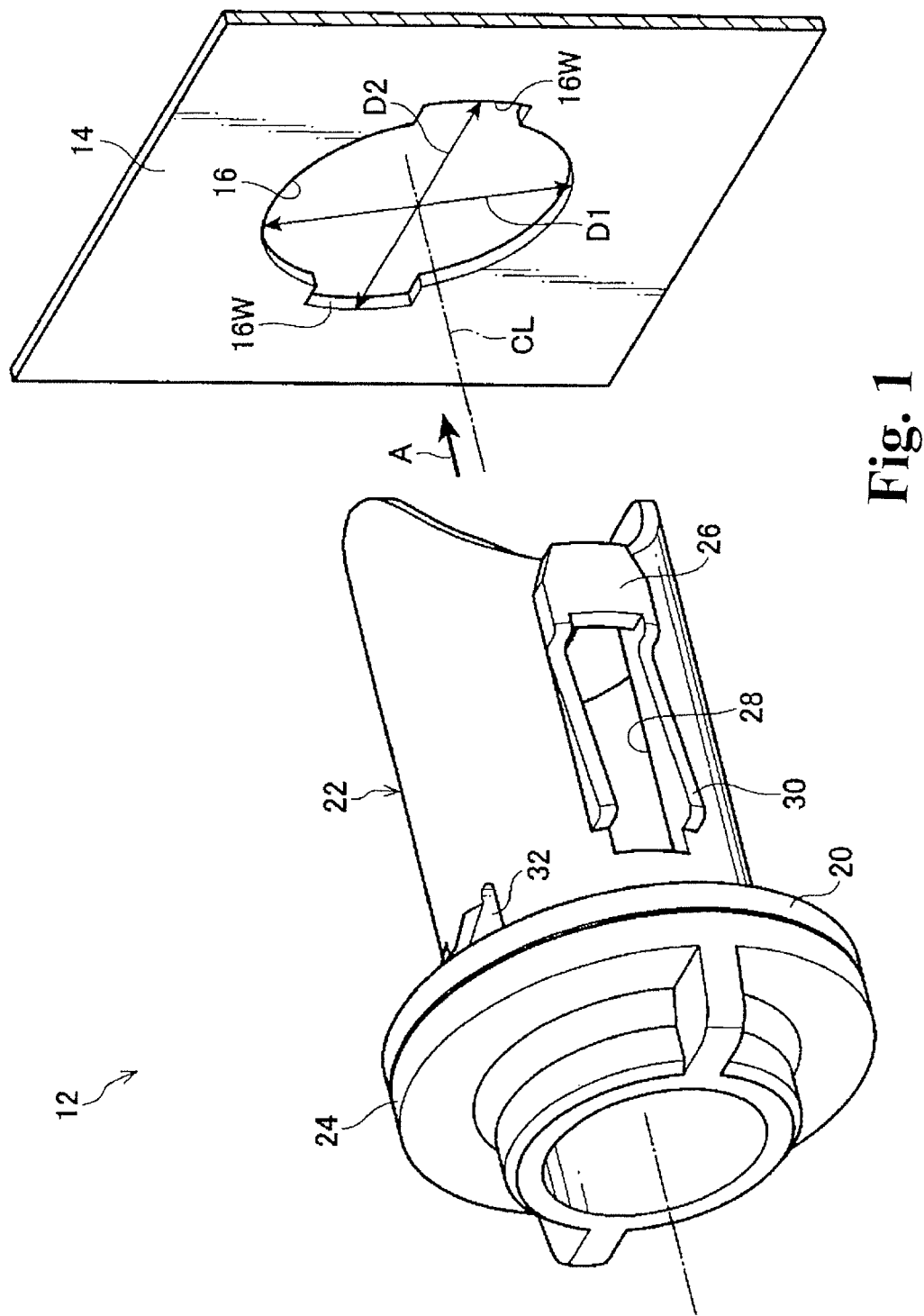
FIG. 1 is a perspective view showing a retainer structure of one embodiment of the present invention with a body panel of an automobile.
Figure 2:
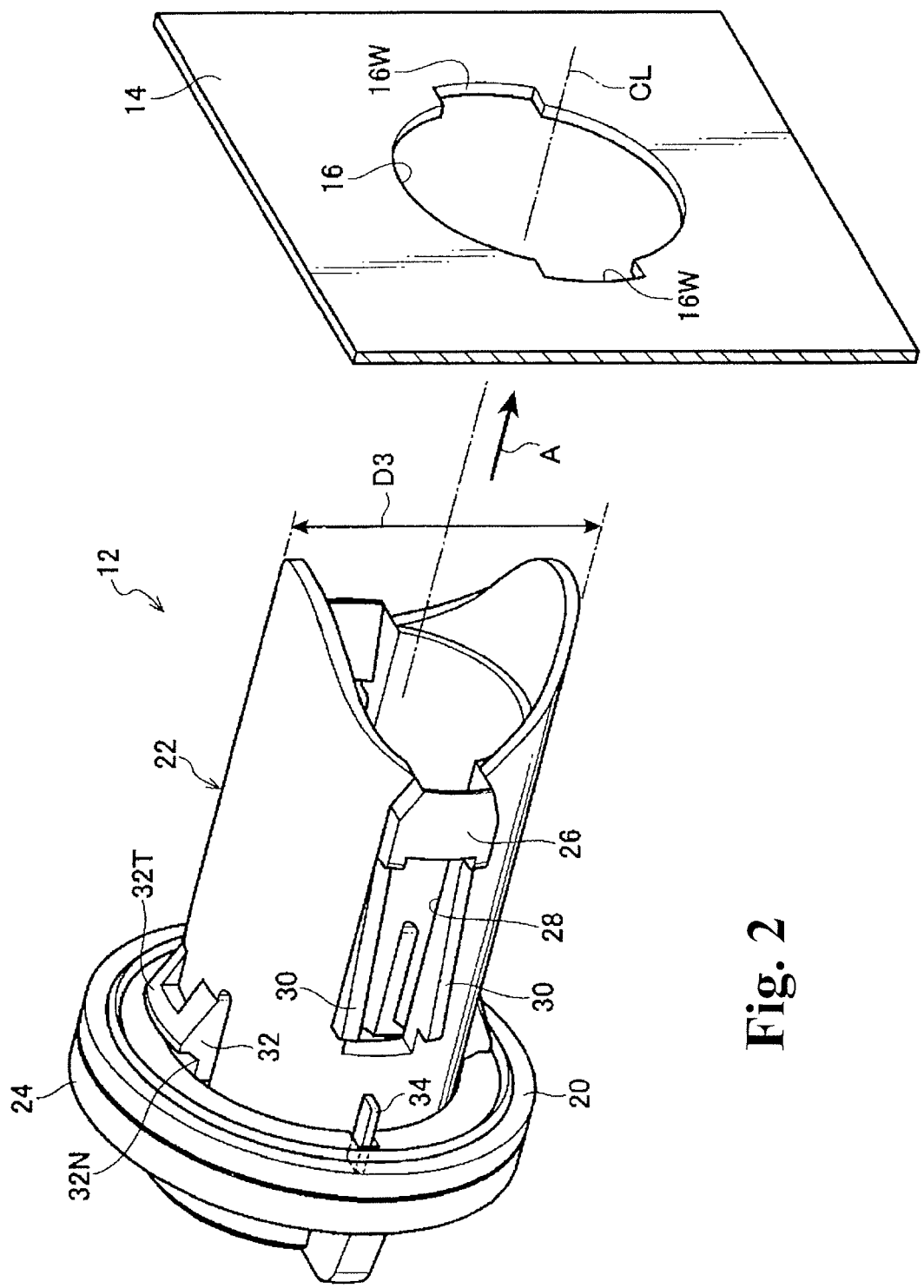
FIG. 2 is a perspective view showing the retainer structure of one embodiment of the present invention with the body panel of the automobile.
Figure 3:
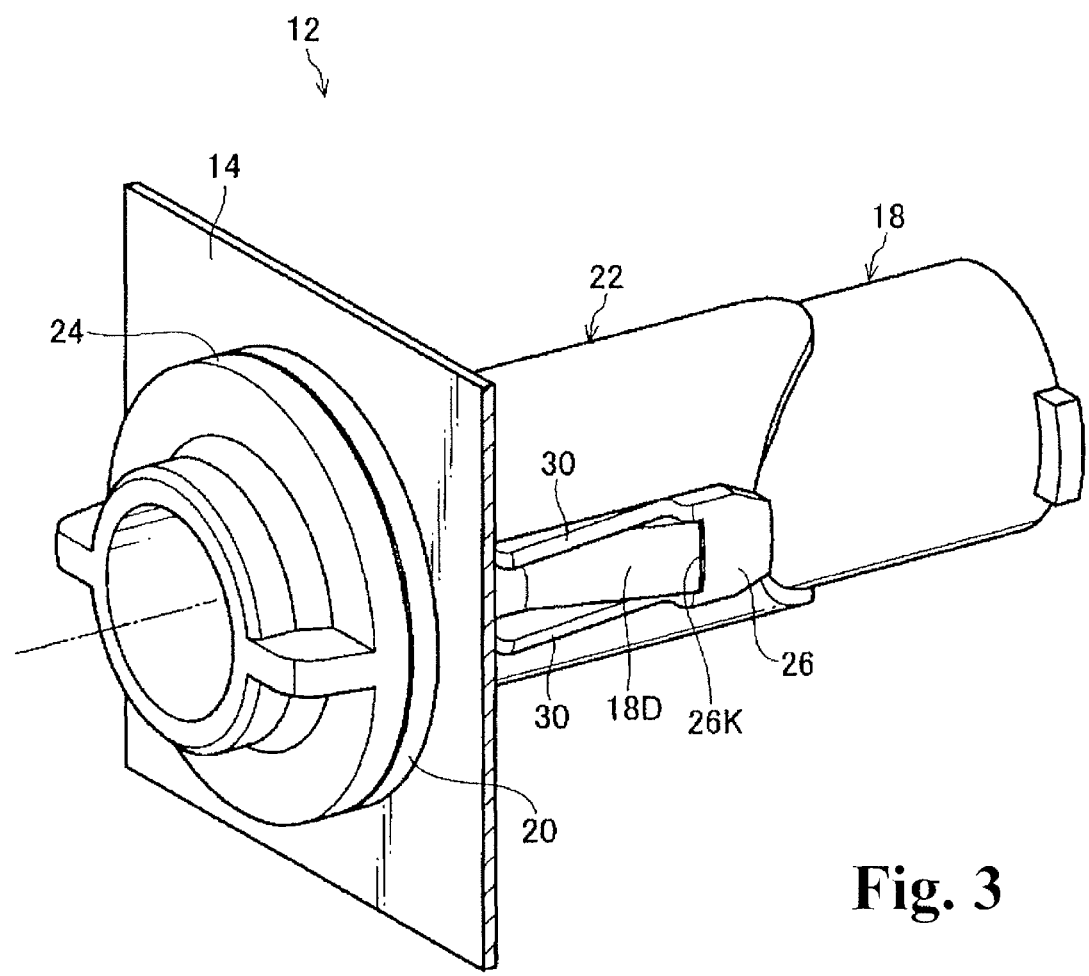
FIG. 3 is a perspective view showing a state in which a cap is attached to the body panel of the automobile using the retainer structure of one embodiment of the present invention.
Figure 4:
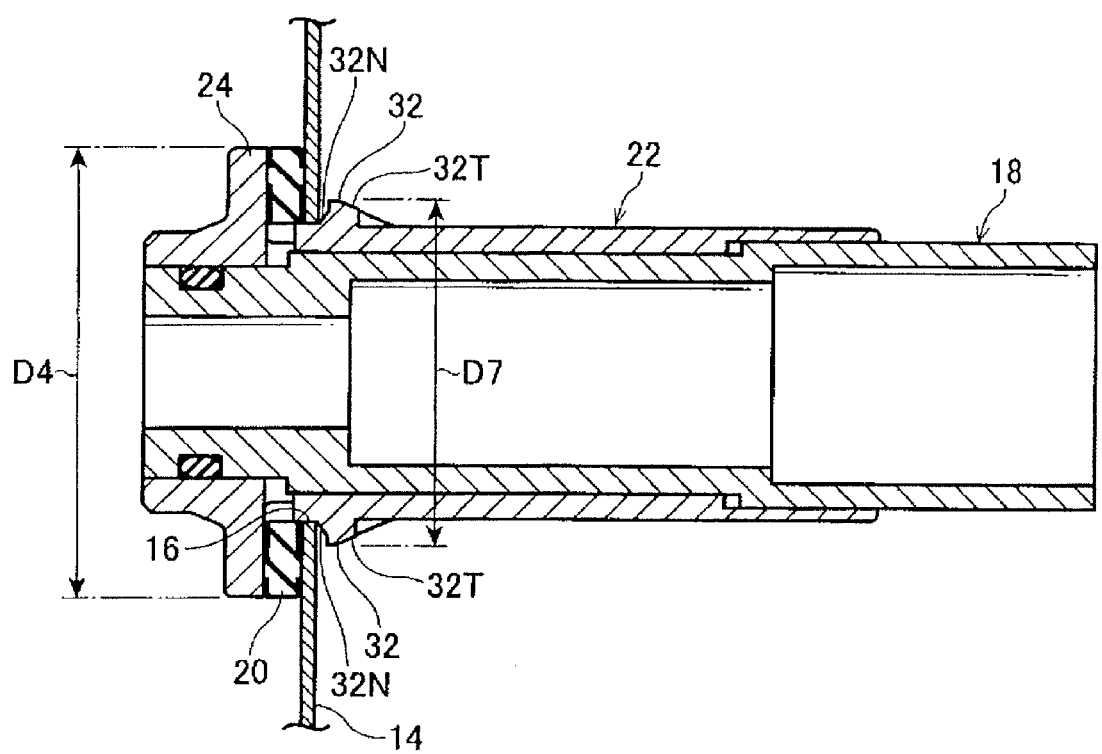
FIG. 4 is a cross-sectional view showing the state in which the cap is attached to the body panel of the automobile using the retainer structure of one embodiment of the present invention with a vertical cross-sectional surface passing a center of a retainer main body.
Figure 5:
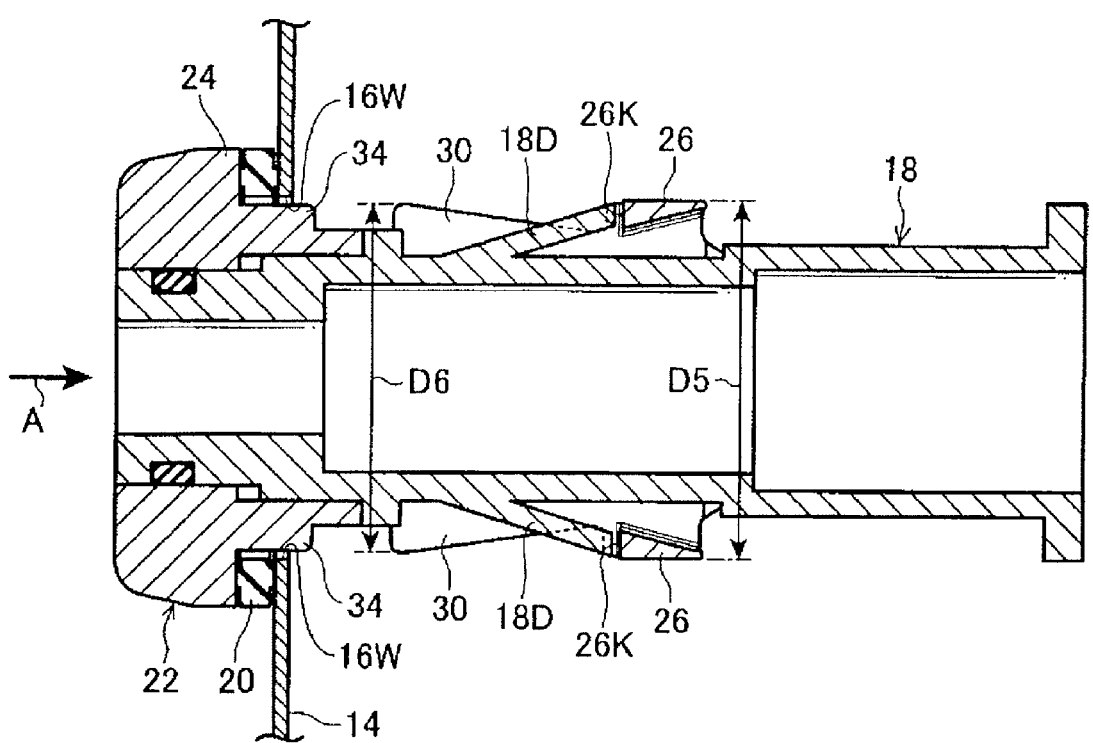
FIG. 5 is a cross-sectional view showing the state in which the cap is attached to the body panel of the automobile using the retainer structure of one embodiment of the present invention with a horizontal cross-sectional surface passing the center of the retainer main body.

FIGS. 1 and 2 show a retainer structure 12 of one embodiment of the present invention. Also, FIGS. 3 to 5 show a state in which a cap 18 is attached to a body panel 14 near a fuel lid of an automobile by using the retainer structure 12. In the body panel 14 of the automobile, an attachment hole 16 is formed. When a retainer main body 22 is inserted and fixed in the attachment hole 16, and also the cap 18 is attached to the body panel 14 through the retainer main body 22, the retainer structure 12 of the present embodiment is applied. Incidentally, in the drawings, an insertion direction of the retainer main body 22 is shown by an arrow A.

The attachment hole 16 is formed in an approximately circular shape including a certain amount of an inner diameter D1. Also, in the attachment hole 16, expanded-diameter portions 16W wherein the diameter is partially expanded are formed in one portion or a plurality of portions (two portions in a crosswise direction symmetric relative to a center line CL in FIGS. 1 and 2). Incidentally, an inner diameter of the expanded-diameter portions 16W is D2.

As shown in FIGS. 3 to 5, the cap 18 is formed in an approximately cylindrical shape. In a state of being attached to the body panel 14, a back end side (a side opposite to the arrow A) of the cap 18 is exposed from an outer side of the body panel 14. For example, a cable, which extends from an operating lever of a driver's seat and is not shown in the figures, is connected to an end side (a side of the arrow A) of the cap 18. Also, inside the cap 18, a lock pin which is not shown in the figures is movably inserted along an axial direction. A back end of the lock pin moves forward and backward from a back end of the cap 18 so as to lock and unlock the fuel lid.

The retainer structure 12 includes the approximately cylindrical retainer main body 22. An outer diameter D3 of the retainer main body is made slightly shorter than the inner diameter D1 of the attachment hole 16. On a back end side of the retainer main body 22, there is formed a flange portion 24 whose diameter is expanded across an entire periphery of the retainer main body 22. An outer diameter D4 of the flange portion 24 is made larger than the inner diameter D1 of the attachment hole 16. In a state wherein the retainer main body 22 is attached to a predetermined position of the body panel 14, an annular seal packing 20 surrounding the retainer main body 22 is interposed between the flange portion 24 and the body panel 14.

On an end side of the retainer main body 22, cap holding pieces 26 are formed in one portion or a plurality of portions (two portions which are symmetric relative to the center line CL in the present embodiment). The cap holding pieces 26 are formed so as to partially protrude an outer circumferential surface of the retainer main body 22 to an outer side in a radial direction. Faces of back end sides of the cap holding pieces 26 are locking surfaces 26K. An interval D5 between end portions of the outer side in the radial direction of the cap holding pieces 26 is set larger than the inner diameter D1 of the attachment hole 16, and smaller than the inner diameter D2 of the expanded-diameter portions 16W. As shown in FIGS. 1 and 2, when the cap holding pieces 26 are positioned in the expanded-diameter portions 16W, and the retainer main body 22 is moved in an arrow A direction relative to the attachment hole 16, the cap holding pieces 26 pass through the expanded-diameter portions 16W. Specifically, the retainer main body 22 can be inserted without hitting the body panel 14.

Figure 9:
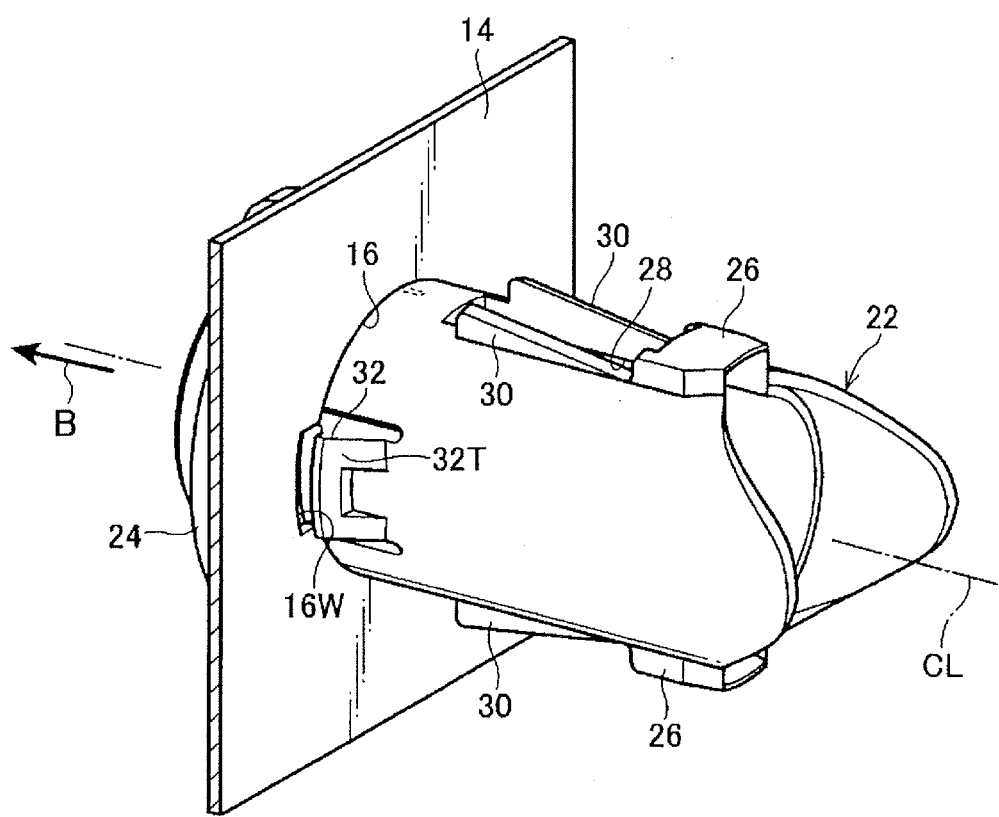
FIG. 9 is a perspective view showing the retainer structure of one embodiment of the present invention in the course of being removed from the body panel of the automobile.

On a back end side rather than the cap holding pieces 26, there is formed a through-bore 28 allowing the elastic pieces 18D hereinafter described to partially insert to pass through. Then, on both sides of the through-bore 28 (both sides in a circumferential direction of the retainer main body 22), as shown in FIG. 9, there are formed movement-restriction walls 30 hitting the body panel 14 so as to restrict the movement when the retainer main body 22 has moved in an escaping direction (an arrow B direction). An interval D6 between end portions of the outer side in the radial direction of the movement-restriction walls 30 is made approximately equal to the interval D5 between the end portions of the outer side in the radial direction of the cap holding pieces 26.

On the other hand, in the cap 18, there are formed the elastic pieces 18D obliquely extending to the outer side in the radial direction in an approximately intermediate portion in the axial direction. When the cap 18 is inserted into an inside of the retainer main body 22, the elastic pieces 18D bend to an inner side in the radial direction by being pressed against an inner circumferential surface of the retainer main body 22 so as to allow an insertion of the cap 18. Then, as shown in FIG. 5, in a state wherein the cap 18 is inserted into the retainer main body 22 up to a predetermined position, the elastic pieces 18D reach a position of the through-bore 28 so as to elastically restore to the original state to the outer side in the radial direction. At this time, ends of the elastic pieces 18D face the locking surfaces 26K of the cap holding pieces 26, and are locked so as to block the cap 18 from escaping from the retainer main body 22 (moving in the arrow A direction).

In the retainer main body 22, in a position of an end side rather than the flange portion 24, panel clamping pieces 32 are formed in one portion or a plurality of portions (two portions which are symmetric relative to the center line CL in the present embodiment). The panel clamping pieces 32 are formed in a cantilever plate spring shape by partially notching the outer circumferential surface of the retainer main body 22 in an approximately U shape. Specifically, the panel clamping pieces 32 elastically bend in the radial direction of the retainer main body 22 so as to be capable of deforming.

An interval D7 between end portions of the outer side in the radial direction of the panel clamping pieces 32 is made longer than the inner diameter D1 of the attachment hole 16 in a natural state (a state which is not bent and deformed). Viewing the retainer main body 22 in the insertion direction (the arrow A direction), in a state wherein positions of the panel clamping pieces 32 are matched in positions of the expanded-diameter portions 16W, when the panel clamping pieces 32 are moved in a pull-out direction (a direction opposite to the arrow A) from the attachment hole 16 relative to the retainer main body 22, the panel clamping pieces 32 pass through the expanded-diameter portions 16W so as not to hit the body panel 14. Also, when the panel clamping pieces 32 bend and are deformed, the interval D7 shrinks until at least the interval D7 becomes equal to the inner diameter D1 of the attachment hole 16 (the panel clamping pieces 32 evacuate to the inner side in the radial direction of the retainer main body 22).

In the panel clamping pieces 32, taper surfaces 32T are formed on the end side of the retainer main body 22, and clamping surfaces 32N are formed on the back end side, respectively. The taper surfaces 32T have a function of allowing the panel clamping pieces 32 to bend to the inner side in the radial direction of the retainer main body 22 by contacting a hole wall of the attachment hole 16 when the panel clamping pieces 32 are inserted into the attachment hole 16 of the body panel 14. Also, the clamping surfaces 32N have a function of contacting the body panel 14 from a side opposite to the seal packing 20 in a state wherein the retainer main body 22 is inserted up to a predetermined position of the attachment hole 16 (a position wherein the seal packing 20 contacts the body panel 14) so as to clamp the body panel 14 between the clamping surfaces 32N and the flange portion 24 (strictly, the seal packing 20).

Then, the panel clamping pieces 32 are formed in a position different in the circumferential direction of the retainer main body 22 relative to the cap holding pieces 26 and the movement-restriction walls 30 (in the present embodiment, a position wherein the panel clamping pieces 32 and the cap holding pieces 26 have a 90-degree deviation in phase in the circumferential direction). In other words, when the panel clamping pieces 32 are in a rotational position of the retainer main body 22 in such a way of passing through the expanded-diameter portions 16W, the cap holding pieces 26 are in a position deviated in the circumferential direction from the expanded-diameter portions 16W. In a similar fashion, when the cap holding pieces 26 are in the rotational position of the retainer main body 22 in such a way of passing through the expanded-diameter portions 16W, the panel clamping pieces 32 are in the position deviated in the circumferential direction from the expanded-diameter portions 16W.

In the retainer main body 22, rotation-restriction ribs 34 are additionally formed. The rotation-restriction ribs 34 extend in a plate shape toward the outer side in the radial direction of the retainer main body 22 in an approximately same position as the cap holding pieces 26 when the retainer main body 22 is viewed in the insertion direction (the arrow A direction). The rotation-restriction ribs 34 have predetermined rigidity in themselves so as not to be fractured carelessly. However, if a force more than a predetermined value acts in the circumferential direction of the retainer main body 22, the rotation-restriction ribs 34 are fractured.

Figure 7:
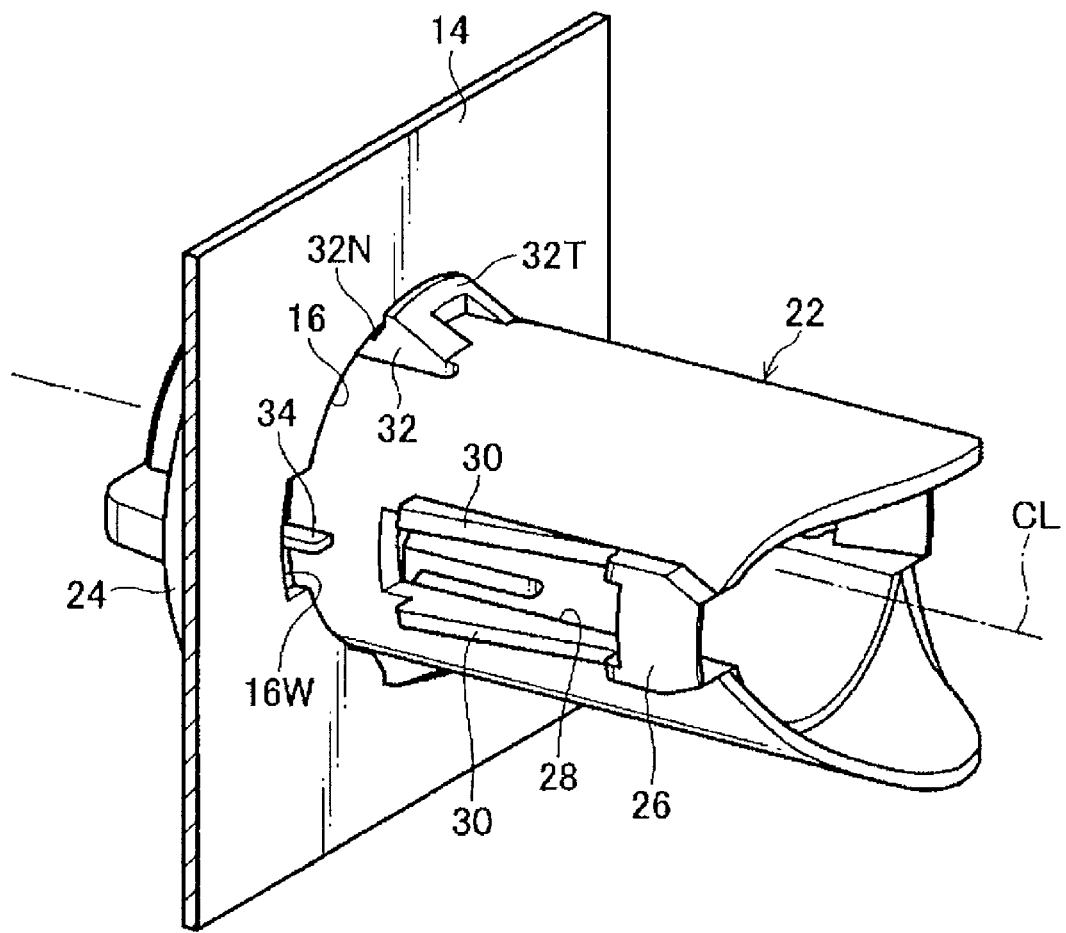
FIG. 7 is a perspective view showing the retainer structure of one embodiment of the present invention in the state of being attached to the body panel of the automobile.

Then, as shown in FIG. 7, the rotation-restriction ribs 34 are formed in a position housed in the expanded-diameter portions 16W of the attachment hole 16 when the retainer main body 22 is in a predetermined position (a position wherein the panel clamping pieces 32 clamp the body panel 14 between the panel clamping pieces 32 and the flange portion 24). The thickness of the rotation-restriction ribs 34 (the plate thickness measured in the circumferential direction of the retainer main body 22) is shorter than the length in the circumferential direction of the expanded-diameter portions 16W, so that within a range wherein the rotation-restriction ribs 34 move the expanded-diameter portions 16W, a rotation in the circumferential direction of the retainer main body 22 is allowed. However, when the rotation-restriction ribs 34 contact a hole wall of the expanded-diameter portions 16W, a rotation of the retainer main body 22 is restricted. At this time, if a rotational force more than a predetermined value acts on the retainer main body 22 further, the rotation-restriction ribs 34 are fractured, so that the retainer main body 22 can rotate in the circumferential direction further.

Next, an operation of the retainer structure 12 of the present embodiment will be explained.

In a case wherein the retainer main body 22 is attached to the body panel 14, at first, as shown in FIGS. 1 and 2, in order for the cap holding pieces 26 and the movement-restriction walls 30 to be positioned corresponding to the expanded-diameter portions 16W of the attachment hole 16, the retainer main body 22 is appropriately rotated in the circumferential direction. Then, the retainer main body 22 is inserted into the attachment hole 16. The interval D5 (see FIG. 5) of the cap holding pieces 26 is set smaller than the inner diameter D2 (see FIG. 1) of the expanded-diameter portions 16W, so that in a state wherein the cap holding pieces 26 are positioned in the expanded-diameter portions 16W, the cap holding pieces 26 pass through the expanded-diameter portions 16W so as not to hit the body panel 14. Therefore, the retainer main body 22 can be inserted into the attachment hole 16 further.

In the course of the insertion, the panel clamping pieces 32 hit the body panel 14. However, the taper surfaces 32T of the panel clamping pieces 32 are pressed by the body panel 14, so that the panel clamping pieces 32 elastically bend and evacuate to the inner side in the radial direction of the retainer main body 22. Thereby, the retainer main body 22 can be inserted into the attachment hole 16 further.

Figure 6:
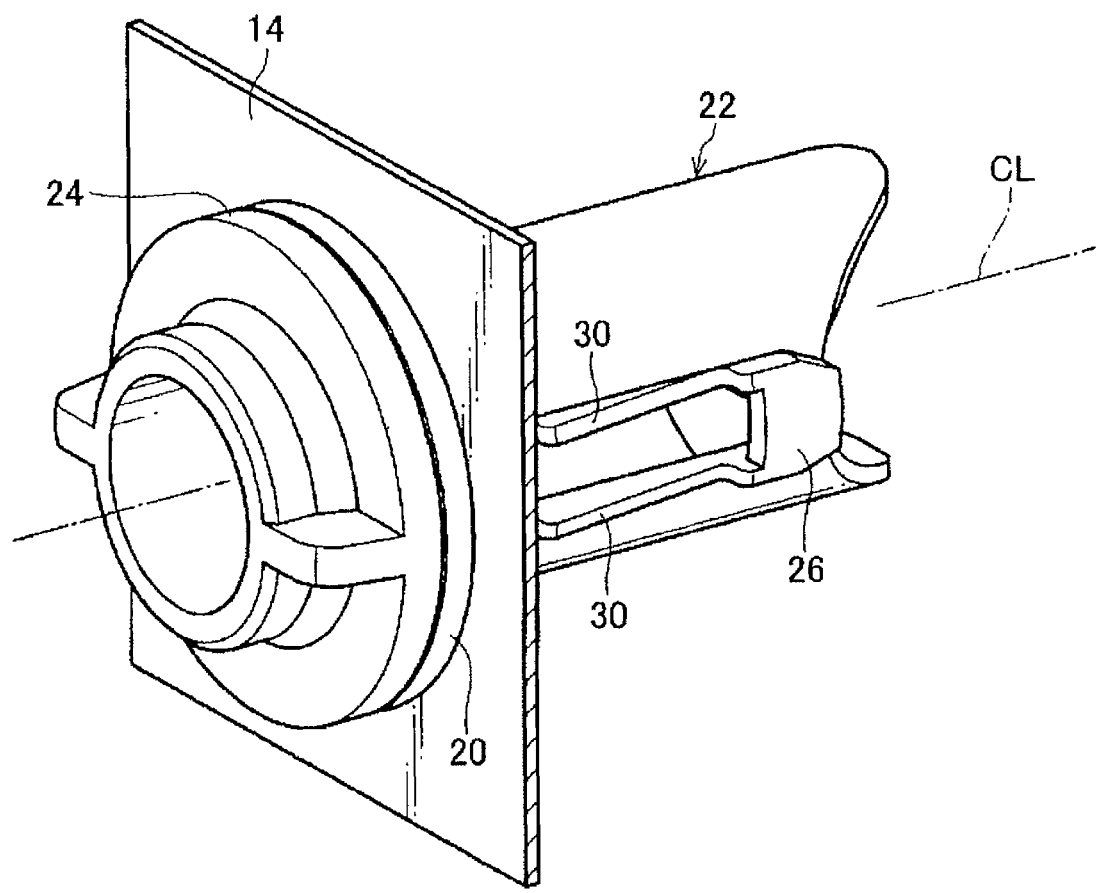
FIG. 6 is a perspective view showing the retainer structure of one embodiment of the present invention in a state of being attached to the body panel of the automobile.

Then, as shown in FIGS. 6 and 7, when the seal packing 20 contacts the body panel 14, the insertion of the retainer main body 22 into the attachment hole 16 is halted. A position of the retainer main body 22 at this time is an attachment position to the body panel 14. In this state, as also shown in FIG. 4, the panel clamping pieces 32 are elastically restored to original state, and the clamping surfaces 32N contact the body panel 14 from the side opposite to the seal packing 20 so as to clamp the body panel 14 between the clamping surfaces 32N and the flange portion 24 (strictly, the seal packing 20). Therefore, the retainer main body 22 is maintained in an attachment state to the body panel 14, so that the retainer main body 22 does not carelessly miss-aligned, or drop off relative to the body panel 14. Also, due to the seal packing 20, a sealing property between the body panel 14 and the retainer main body 22 is ensured.

Thus, in the retainer structure 12 of the present embodiment, by an operation (a single operation) of only applying the retainer main body 22 to the attachment hole 16 and pushing in, the retainer main body 22 can be easily attached to the body panel 14. For example, at an attachment time of the retainer main body 22 to the body panel 14, the retainer main body 22 is not required to be rotated.

Here, when the retainer main body 22 is attached to the body panel 14, a conventional structure in which the retainer main body 22 is rotated in the circumferential direction is considered. In such a structure, there is a case wherein the retainer main body 22 rotates in a state wherein the retainer main body 22 sandwiches the seal packing 20 between the retainer main body 22 and the body panel 14, so that there is a possibility that the seal packing 20 may deform. In the present embodiment, without rotating the retainer main body 22, the retainer main body 22 can be attached to the body panel 14, so that there is no possibility for a seal ring to deform in such a manner so as to be capable of ensuring a high sealing property.

Also, as will be noted from FIG. 7, when the retainer main body 22 is in a predetermined attachment position, the rotation-restriction ribs 34 are housed inside the expanded-diameter portions 16W. Therefore, the rotation in the circumferential direction of the retainer main body 22 is restricted within the range wherein the rotation-restriction ribs 34 move inside the expanded-diameter portions 16W, and an excessive rotation of the retainer main body 22 is blocked. Thereby, the retainer main body 22 is prevented from escaping from the attachment hole 16 carelessly.

Figure 8:
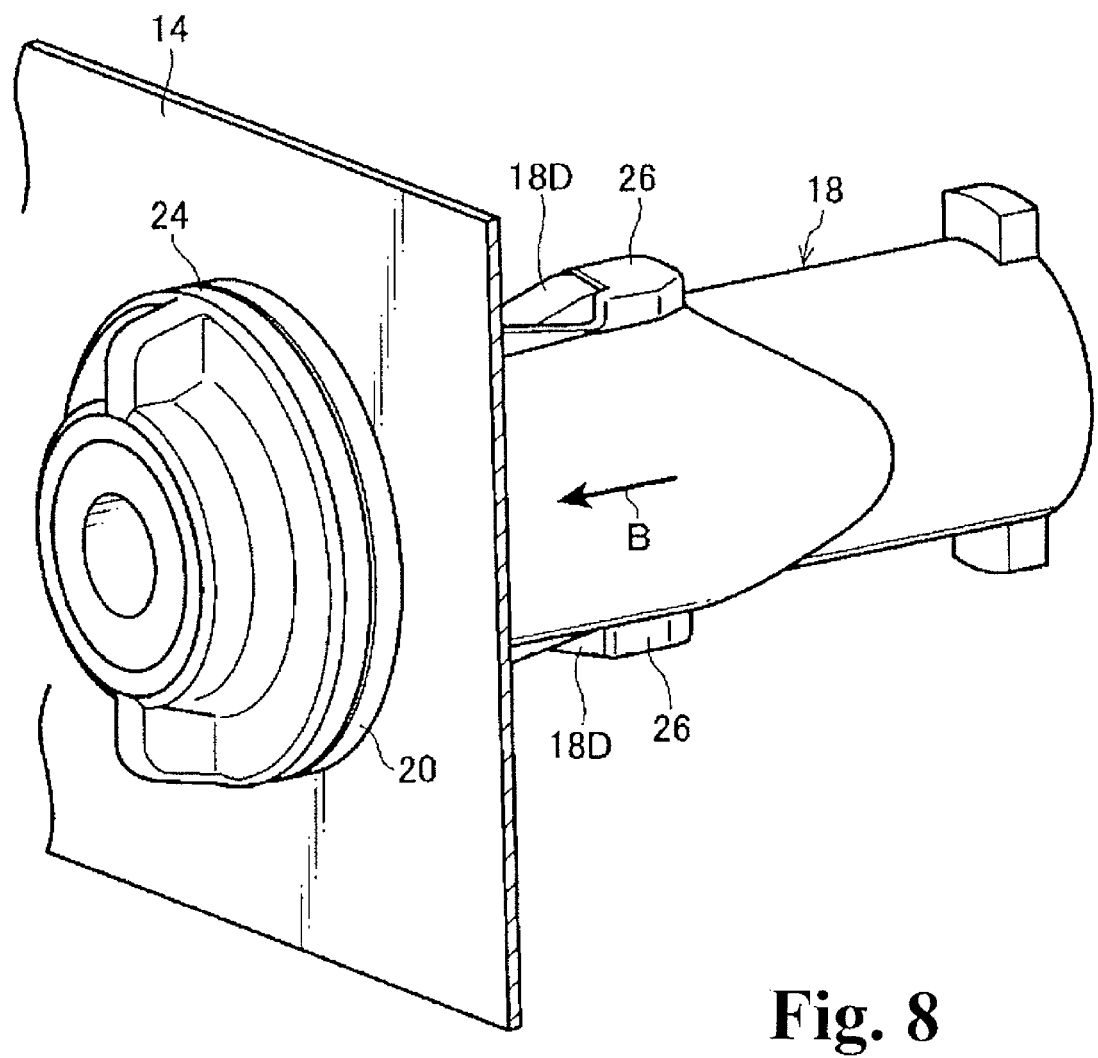
FIG. 8 is a perspective view showing the retainer structure of one embodiment of the present invention in the course of being removed from the body panel of the automobile.

In a case wherein the retainer main body 22 is removed from the body panel 14, at first, as shown in FIG. 8, the retainer main body 22 is rotated in the circumferential direction. As mentioned above, this rotation is restricted by the rotation-restriction ribs 34 hitting the hole wall of the expanded-diameter portions 16W. However, the rotation-restriction ribs 34 are fractured if a force more than the predetermined value acts. Therefore, the rotation-restriction ribs 34 are fractured by rotating the rotation-restriction ribs 34 in the circumferential direction. Then, as shown in FIG. 9, the panel clamping pieces 32 are allowed to reach positions of the expanded-diameter portions 16W. At this time, from the attachment state shown in FIGS. 6 and 7, the retainer main body 22 is rotated 90 degrees in the circumferential direction.

At this time, the panel clamping pieces 32 do not hit the body panel 14, so that if a force in the pull-out direction (the arrow B direction) from the attachment hole 16 acts on the retainer main body 22, the panel clamping pieces 32 pass through the expanded-diameter portions 16W, and the retainer main body 22 moves in the pull-out direction.

Figure 10:
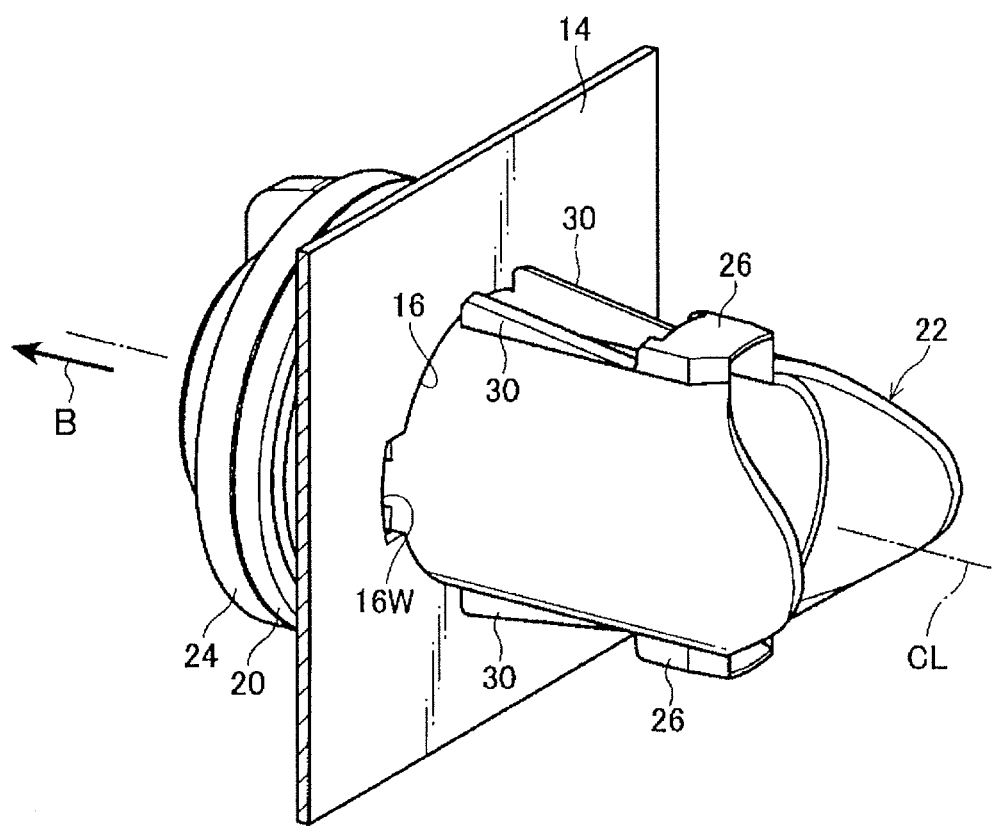
FIG. 10 is a perspective view showing the retainer structure of one embodiment of the present invention in the course of being removed from the body panel of the automobile.
Figure 11:
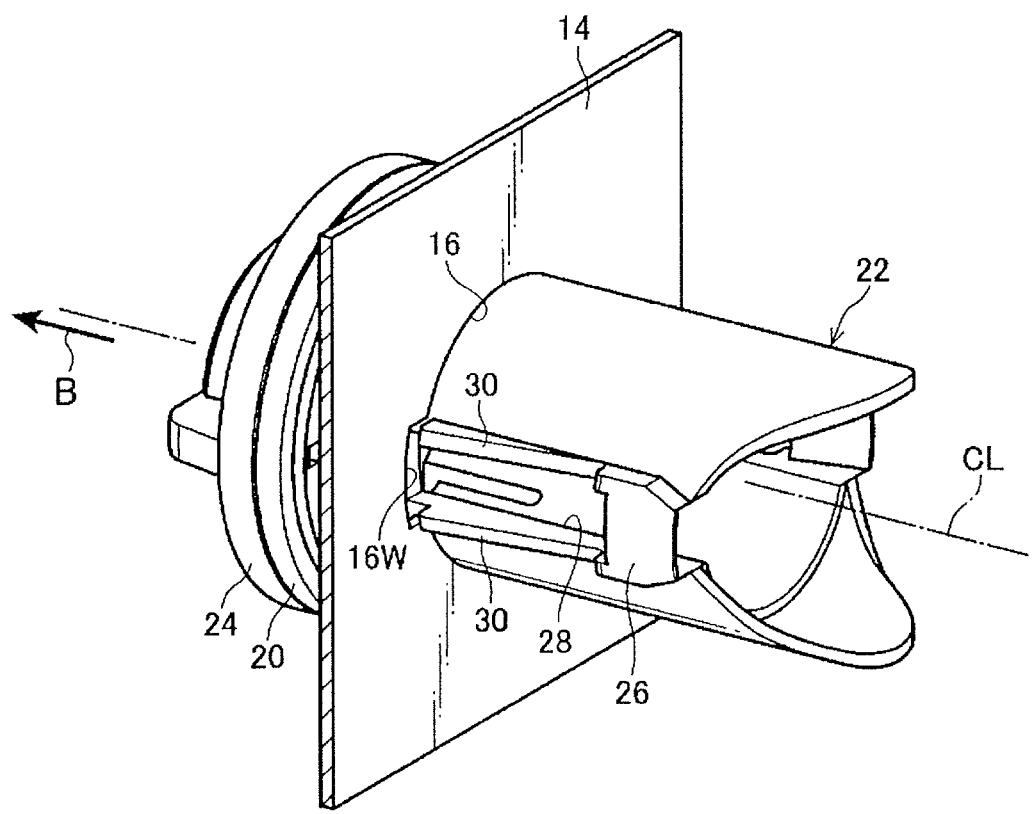
FIG. 11 is a perspective view showing the retainer structure of one embodiment of the present invention in the course of being removed from the body panel of the automobile.
Figure 12:
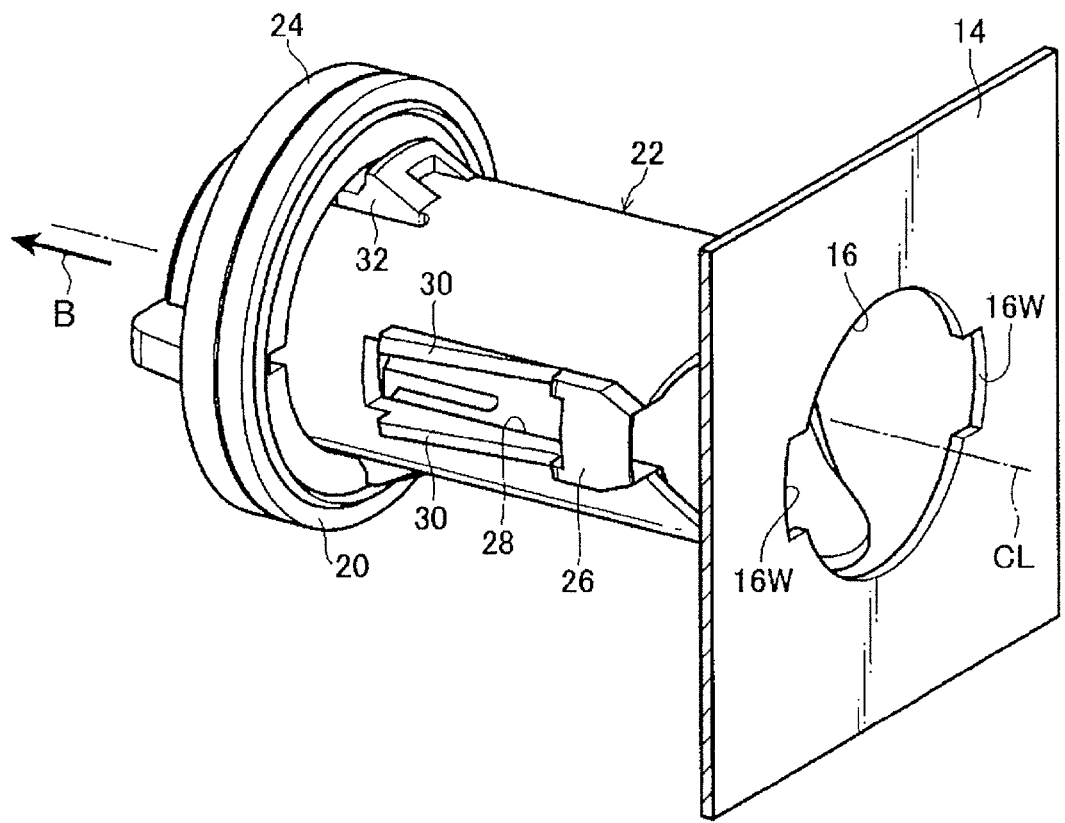
FIG. 12 is a perspective view showing the retainer structure of one embodiment of the present invention in a state of being removed from the body panel of the automobile.

As shown in FIG. 10, this movement is halted by the movement-restriction walls 30 hitting the body panel 14. Here, as shown in FIG. 11, if the retainer main body 22 is rotated in the circumferential direction (90 degrees in the present embodiment) further, and the movement-restriction walls 30 and the cap holding pieces 26 are positioned corresponding to the expanded-diameter portions 16W, the retainer main body 22 can be pulled out further so as to be removed from the body panel 14 (see FIG. 12).

Thus, in the retainer structure 12 of the present embodiment, even an operation of removing the retainer main body 22 from the body panel 14 can be completed only by the rotation of the retainer main body 22 and a movement in the pull-out direction. There is no need for tools or a hand to be put on a reverse side of the body panel 14, and by an operation only from the outer side of the body panel 14, the retainer main body 22 can be removed from the body panel 14 so as to have excellent workability.

Incidentally, in the aforementioned embodiment, as a clamping piece of the present invention, the panel clamping pieces 32, formed in two portions in the circumferential direction of the retainer main body 22, are shown, and as an attaching piece of the present invention, the cap holding pieces 26, likewise formed in two portions in the circumferential direction of the retainer main body 22, are shown. However, the shape or the number of the clamping piece or the attaching piece is not limited to the above. The clamping piece and the attaching piece do not have to have the 90-degree deviation in phase provided that the clamping piece and the attaching piece are formed in positions different in the circumferential direction. For example, the expanded-diameter portions 16W of the attachment hole 16 may be formed in three portions or three portions or more in the circumferential direction, and the number of the panel clamping pieces 32 or the cap holding pieces 26 may have a number fewer than the number of the expanded-diameter portions 16W provided that when the retainer main body 22 is in a predetermined rotational position, the panel clamping pieces 32 can pass through the expanded-diameter portions 16W, and provided that when the retainer main body 22 is in a different rotational position, the cap holding pieces 26 can pass through the expanded-diameter portions 16W.

EXPLANATION OF SYMBOLS

12 a retainer structure
14 a body panel
16 an attachment hole
16W expanded-diameter portions
18 a cap (an attached member)
18D elastic pieces
20 a seal packing (a contacted member)
22 a retainer main body
24 a flange portion (a contacting piece)
26 cap holding pieces (attaching pieces)
26K locking surfaces
28 a through-bore
30 movement-restriction walls
32 panel clamping pieces (clamping pieces)
32T taper surfaces
32N clamping surfaces
34 rotation-restriction ribs (rotation-restriction members)

What is claimed is:

1. A retainer structure, comprising:
a retainer main body inserted into an attachment hole of a panel, and also rotatable in a circumferential direction orthogonal to an insertion direction in an insertion state;
a contacting piece formed to expand in a diameter of the retainer main body, and contacting a contacted member on the panel side by an insertion into the attachment hole so as to restrict the insertion;
a clamping piece protruding from the retainer main body, contacting a hole wall of the attachment hole by inserting the retainer main body into the attachment hole, elastically evacuating to a retainer main body side so as to allow the insertion, and in a state wherein the retainer main body is inserted for a predetermined amount, elastically restoring to original state, clamping the panel between the clamping piece and the contacting piece, and also capable of passing through relative to an expanded-diameter portion in which a diameter of the attachment hole is partially expanded in a natural state; and
an attaching piece in which an attached member is attached at an end side in the insertion direction relative to the clamping piece in the retainer main body, and also capable of passing through the expanded-diameter portion,
wherein the clamping piece and the attaching piece are formed in a position different in the circumferential direction of the retainer main body such that a position, in which the retainer main body has rotated relative to the panel when the clamping piece passes through the expanded-diameter portion, differs from a position in which the retainer main body has rotated relative to the panel when the attaching piece passes through the expanded-diameter portion.

2. A retainer structure according to claim 1, further comprising a rotation-restriction member formed in the retainer main body; housed in the expanded-diameter portion in a state wherein the clamping piece jolts out of alignment in the circumferential direction relative to the expanded-diameter portion, and the retainer main body is inserted up to a predetermined position, to restrict a rotational range of the retainer main body in the circumferential direction; and also fractured by a rotational force more than a predetermined value.

3. A retainer structure according to claim 1, further comprising a movement-restriction wall projecting from the retainer main body, wherein when the retainer main body moves in a pull-out direction from the attachment hole, the movement-restriction wall allows the retainer main body to pass through the expanded-diameter portion, and also restrict a movement of a retainer by contacting the panel except for the expanded-diameter portion.

* * * * *